UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

METHOD OF COATING ACTIVE MATERIAL WITH FLAKE-LIKE CONDUCTING MATERIAL.

No. 839,371.        Specification of Letters Patent.        Patented Dec. 25, 1906.

Application filed March 30, 1905. Serial No. 252,931.

*To all whom it may concern:*

Be it known that I, THOMAS A. EDISON, a citizen of the United States, residing at Llewellyn Park, Orange, in the county of Essex and State of New Jersey, have invented a certain new and useful Method of Coating Electrolytically-Active Material with Flake-Like Conducting Material, of which the following is a description.

My invention relates to an improved process for coating electrolytically-active material with flake-like conducting material; and the invention relates particularly to a new method of coating electrolytically-active nickel hydroxid or other active salt with flake-like conducting material—such as flake graphite or flake nickel, or cobalt, or an alloy of nickel and cobalt for use in connection with the manufacture of the positive electrodes of my improved storage battery.

My present invention presents a process which can be carried out effectively with flake-like conducting material even when the latter is of a very friable nature, as is the case with electrodeposited nickel or cobalt films, and since practically no pressure is utilized in the mixing operation there can be no objectionable grinding of the nickel or cobalt if used. Furthermore, the resulting cake or mass of active material is of such a character that good contact throughout its entire mass is secured, and all the particles will have an equal opportunity of being acted upon by the current. The active mass will present innumerable paths through which the current may traverse, permitting all the particles of active material to be reached and acted upon by the current.

In carrying my invention into effect I proceed substantially as follows: A suitable nickel compound—such as the hydroxid thereof, obtained in any suitable way—is first ground so as to present particles of substantially a definite size, ranging, say, between those which pass a twenty-mesh screen and are arrested by a sixty-mesh screen. To the active mass I then mix a sufficient quantity of a suitable sticky material until the surfaces of the active particles are covered with a thin layer of the sticky material. The preferred sticky material used is molasses, which is cheap and can be readily removed by washing; but obviously any other suitable material for the purpose may be employed. The mixing of the sticky material with the active mass is preferably effected in a suitable mixer wherein little or no pressure is applied—such, for example, as that described in my Patent No. 605,668, of June 14, 1888. After the sticky material has been intimately mixed with the active mass and while preferably in the mixer I add the flake-like conducting material—such as flake graphite, or flake-like metallic nickel, or cobalt, or nickel-cobalt alloy—and continue the mixing until practically the whole exposed surfaces of all the active particles are covered with the conducting films or plates. Under the microscope it has been observed that frequently a single particle may be covered with a number of small flakes adhering to the facets of the particles, and in some instances the flakes or foils are actually bent around the particles, so as to wholly or partially envelop the same without, however, preventing the free escape of gas. Whatever the particular disposition of the flakes or scales upon or with respect to the active particles may be the fact is that by the process described the active particles are practically covered as to their entire surfaces by flakes or scales of the conducting material. Suitable proportions which may be employed are eight parts, by weight, of nickel hydroxid and two parts, by weight, of the flake-like conducting material. With these proportions the continued mixing as described results in the complete covering of the active particles, as explained, so that the entire mass uniformly presents the appearance of being composed wholly of the flake-like conducting substance.

After the mixing operation the mass is dried and is then applied in the usual way to the pockets of the battery-grid and subjected to a moderate pressure, generally about one-third of that ordinarily employed, or about two thousand pounds per pocket. This pressure is sufficient to hold the powdered mass in position, and in this condition the electrode-plates are immersed in water, slightly alkaline, to prevent rust and the molasses thoroughly dissolved out. A thorough dissolution of the sticky material generally requires several changes of water and takes place in about forty-eight hours. The plate is now thoroughly dried, and the final pressure (about six thousand pounds per pocket) is applied to lock the pocket-sections in place, after which the electrode is ready to be assembled in the battery.

Having now described my invention, what I claim as new therein, and desire to secure by Letters Patent, is as follows:

1. The process of covering active particles with flake-like conducting material, which includes adding a sticky material to and mixing the same with the active particles, whereby a sticky film will be applied to each particle, and in then mixing a flake-like material with the coated active particles, whereby the scales or flakes of the former will cover the individual particles of the active material, substantially as set forth.

2. The process of covering active particles with flake-like conducting material, which includes adding molasses to and mixing the same with the active particles, whereby a sticky film will be applied to each particle, and in then mixing the flake-like material with the coated active particles, whereby the scales or flakes of the former will cover the individual particles of the active material, substantially as set forth.

3. The process of covering active particles with flake-like conducting material, which includes adding a sticky material to and mixing the same with the active particles, whereby a sticky film will be applied to each particle, in then mixing a flake-like material with the coated active particles, whereby the scales or flakes of the former will cover the individual particles of the active material, then in applying pressure to the mixture so obtained, and in then removing the sticky material, substantially as set forth.

4. The process of covering active particles with flake-like conducting material, which includes adding a sticky material to and mixing the same with the active particles, whereby a sticky film will be applied to each particle, in then mixing a flake-like material with the coated active particles, whereby the flakes or scales of the former will cover the individual particles of the active material, then in applying pressure to the mixture so obtained, and in then soaking the compressed mass in a solvent of the sticky material, whereby the latter will be dissolved and eliminated, substantially as set forth.

5. The process of covering active particles with flake-like conducting material, which includes adding a sticky material to and mixing the same with the active particles, whereby a sticky film will be applied to each particle, in then mixing a flake-like material with the coated active particles, whereby the scales or flakes of the latter will cover the individual particles of the active material, in then drying the mass, subjecting the same to a moderate pressure and in then removing the sticky material, substantially as set forth.

6. The process of covering active particles with flake-like conducting material, which includes adding molasses to and mixing the same with the active particles, whereby a sticky film will be applied to each particle, in then mixing the flake-like material with the coated active particles, whereby the scales or flakes of the latter will cover the individual particles of the active material, in then drying the mass, subjecting the same to a moderate pressure and then dissolving out the molasses, substantially as set forth.

7. The process of covering active particles with flake-like conducting material, which includes adding molasses to and mixing the same with the active particles, whereby a sticky film will be applied to each particle, in then mixing the flake-like material with the coated active particles, whereby the scales or flakes of the latter will cover the individual particles of the active material, in then drying the mass, subjecting the same to a moderate pressure and in then dissolving out the molasses in alkaline water, substantially as set forth.

8. The process of covering active particles with flake-like conducting material, which consists in adding molasses to and mixing the same with the active particles whereby a sticky film will be applied to each particle, in then mixing the flake-like material with the coated active particles, whereby the scales or flakes of the latter will cover the individual particles of the active material, in then drying the mass, subjecting the same to a moderate pressure and in finally subjecting the material to the desired final pressure, substantially as set forth.

This specification signed and witnessed this 29th day of March, 1905.

THOMAS A. EDISON.

Witnesses:
  FRANK L. DYER,
  ANNA R. KLEHM.